United States Patent [19]

Neaves et al.

[11] Patent Number: 4,879,148
[45] Date of Patent: Nov. 7, 1989

[54] MARKER ASSEMBLY

[75] Inventors: Bryan D. Neaves, Swindon; Frederick W. L. Hill, Lechlade; Malcolm G. Cross, Deddington, all of England

[73] Assignee: Raychem Limited, England

[21] Appl. No.: 157,073

[22] Filed: Feb. 3, 1988

Related U.S. Application Data

[63] Continuation of Ser. No. 20,798, Mar. 2, 1987, abandoned.

[51] Int. Cl.$^4$ .............................................. B32B 5/16
[52] U.S. Cl. .................................. 428/40; 427/372.2; 428/43; 428/147; 428/195; 428/206; 428/321.3; 428/327
[58] Field of Search ............... 428/147, 200, 206, 327, 428/40, 43, 321.3, 195; 427/372.2

[56] References Cited

U.S. PATENT DOCUMENTS

| | | | |
|---|---|---|---|
| 2,027,962 | 1/1936 | Currie | 264/230 |
| 3,086,242 | 4/1963 | Cook et al. | 264/230 X |
| 3,597,372 | 8/1971 | Cook | 264/230 X |
| 3,790,439 | 2/1974 | LaPerre et al. | 428/40 |
| 3,894,731 | 7/1975 | Evans | 264/230 X |
| 4,032,010 | 6/1977 | Evans | 264/230 X |
| 4,206,909 | 6/1980 | Wintle | 264/230 X |
| 4,425,390 | 1/1984 | Changani et al. | 264/230 X |
| 4,450,194 | 5/1984 | Kauffman et al. | 428/327 X |
| 4,608,287 | 8/1986 | Biotteau | 428/327 X |

FOREIGN PATENT DOCUMENTS

| | | |
|---|---|---|
| 118687 | 9/1984 | European Pat. Off. |
| 196283 | 4/1983 | Japan |
| 984216 | 2/1965 | United Kingdom |
| 2059913 | 4/1981 | United Kingdom |
| 2104800 | 3/1983 | United Kingdom |
| 2117270 | 10/1983 | United Kingdom |
| 2082110 | 2/1985 | United Kingdom |
| 2144345 | 3/1985 | United Kingdom |
| 0157478 | 4/1988 | United Kingdom |

*Primary Examiner*—William J. Van Balen
*Attorney, Agent, or Firm*—Edith A. Rice; Herbert G. Burkard

[57] ABSTRACT

A marker assembly 1 comprises a support layer 2 that has a surface which is provided with a porous coating 3 of a curable material, e.g. a particulate epoxy coating. The coating may be printed on using for example an ink jet printer to form indicia 6, and may be cured after the indicia have been formed in order to render them substantially indelible. The opposite side of the support layer 2 may be provided with suitable means for supporting the maker on a surface, e.g. a layer 4 of adhesive. The marker may be formed from a dimensionally stable or dimensionally heat-recoverable material.

16 Claims, 2 Drawing Sheets

MARKER ASSEMBLY

This application is a continuation, of application Ser. No. 020,798, filed 03/02/87, now abandoned.

This invention relates to marker assemblies, for example panel markers or marker sleeves for marking wires, cables and the like.

There is often a need for identifying components in complex wiring and cable assemblies, and a number of methods have been proposed. For example it has been proposed to produce heat-recoverable markers, either in the form of sleeves or tape, which can be positioned on the object to be marked and recovered so that they are held tightly on the object. Examples of such systems are described in U.S. Pat. Nos. 3,894,731, 4,032,010 and 4,206,909 and in British Published Pat. Specifications Nos. 2,059,913A and 2,082,110A, the disclosures of which are incorporated herein by reference.

One disadvantage of all such systems is that when the object that is marked is subjected to mechanical abuse, it is possible for the indicia on the marker to be erased. This problem is overcome to some extent with the heat-recoverable systems mentioned above by subjecting the printed marker sleeves to a so-called "permatizing" operation in which the sleeves are exposed to an infra-red radiation source for a short period of time. This procedure, however, cannot prevent erasure of indicia when the object is subjected to severe mechanical abuse, for example abrasion of the wire or cable when being pulled through a bulkhead, in which the surface of the marker may be completely worn away. In addition indicia may be erased when the assembly is exposed to solvents and other fluids.

In addition to the marking of wires and cables it is often necessary to provide other objects such as walls, doors, machinery and the like of buildings, vehicles, air and sea craft with identification or other information. This has usually been achieved by means of plastics or metal sheets on which characters have been formed by screen printing. Such markers, however, suffer from very poor solvent resistance. Alternatively, objects may be marked by means of rigid plastics laminates that are engraved with the necessary information and are then screwed in place. Although such laminate markers are usually highly resistant to solvents and mechanical abuse, they suffer from a number of disadvantages: They need to be engraved which increases their cost and reduces their ease of use since the customer usually does not have the necessary equipment for forming the indicia; they are relatively heavy, which is a serious disadvantage when used in aircraft; and they are not capable of being secured to curved surfaces such as pipes and the like.

The present invention provides a marker assembly, which comprises a support layer having a surface that is provided with a porous coating of a latent curable material that is capable of receiving printed indicia and that can subsequently be cured to render the indicia substantially indelible, the assembly preferably being arranged to be secured to an object or surface with the cured coating exposed.

As stated above, the coating material is formed from a latent curable material, that is to say, that the choice of material enables the assembly to be made, distributed and marked before the coating has cured sufficiently to prevent absorption of the ink. Preferably the assembly can be stored for at least 3 months and especially at least 6 months at ambient temperatures before printing.

Whether or not indicia are substantially indelible will depend amongst other things on the ink that is used to form the indicia, and, in particular, on whether it is absorbed or rejected by the curable marker coating material in its uncured state, only those inks that are absorbed by the marker coating being considered appropriate for use with that marker. Indicia that are formed on the coating are considered herein to have been rendered substantially indelible if they can withstand the solvent test specified in Example 1 below with no significant loss of legibility of the indicia in respect of the solvents listed other than any solvents that swell the coating material.

In many instances, however, there will be no significant loss of legibility of the indicia even with solvents that do swell the coating material.

The markers according to the invention have the advantage that they are in general resistant to a broader range of solvents than equivalent non-curable polymeric markers, by virtue of the curing of the coating material. In addition, the curing of the coating material can often improve the thermal stability of the marker.

In one preferred embodiment the marker assembly according to the invention may be used as a panel marker for providing information on flat surfaces such as doors, walls, bulkheads and the like and also on curved surfaces such as pipes, cylinders and the like. In this embodiment the support layer is in the form of a flat sheet, preferably comprising a polymeric material. The sheet may be arranged to be secured to the surface by any appropriate means, for example screws or bolts but will usually be secured by means of a layer of adhesive on the surface of the support layer opposite the porous coating. Preferred adhesives include hot-melt adhesives, cyanoacrylate adhesives, contact adhesives or pressure-sensitive adhesives, e.g. acrylic adhesives. Examples of preferred hot-melt adhesives include those based on olefin homo or copolymers such as ethylene-vinyl acetate or ethylene-ethyl acrylate copolymers, or polyamide hot-melt adhesives, for example those described in U.S. Pat. No. 4,018,733 to Lopez et al the disclosure of which is incorporated herein by reference.

The support layer may be formed from any of a number of materials depending on the degree of mechanical abuse or exposure to chemicals the marker is likely to experience. The support layer should also be able to withstand any heat to which it is exposed when the porous coating is cured. Suitable materials for forming the support layer include aluminium, aromatic ether ketones e.g. polyesters especially polyethylene terephthalate for example sold under the trademark "Mylar" or other polyesters e.g. "Hytrel", polyolefins, fluoropolymers such as polyvinylidine fluoride, polyamides such as nylon 6, nylon 6.6, nylon 11 or nylon 12 and other polymers or metals. The material may be modified if desired to provide it with additional properties, for example the material may incorporate halogenated or halogen-free flame retardants, especially halogen free flame retardants such as hydrated alumina or hydrated magnesia. The material may incorporate additional or alternative fillers in order to pigment it, especially to form a white layer, or one surface, preferably the surface opposite the surface carrying the porous coating, may be metallised, in which case the support layer is preferably transparent or translucent. Other fillers include luminescent materials such as those based on doped zinc sulphide or cadmium sulphide or reflective fillers for example glass microspheres or metal flake. The support layer may be treated in order to improve adhesion, for example by corona discharge, acid etching, plasma treatment or flame treatment.

It may be preferred to cross-link the support layer either chemically or by irradiation e.g. by gamma radiation or by high energy electrons in order to improve the layer's resistance to heat. In a typical chemically cross-linked composition there will be about 0.5 to 5 weight per cent of peroxide based on the weight of the polymeric composition. The cross-linking agent may be employed alone or in association with a co-curing agent such as a polyfunctional vinyl or allyl compound, e.g. triallyl cyanurate, triallyl isocyanurate or pentaerythritol tetra methacrylate.

Radiation cross-linking may be effected by exposure to high energy irradiation such as an electron beam or gamma rays. Radiation dosages in the range of 2 to 80 Mrads, preferably 2 to 50 Mrads, e.g. 2 to 20 Mrads and particularly 4 to 15 Mrads are in general appropriate.

For the purpose of promoting cross-linking during irradiation preferably from 0.2 to 5 weight percent of a prorad such as a polyfunctional vinyl or allyl compound, for example, triallyl cyanurate, triallyl isocyanurate or pentaerythritol tetramethacrylate are incorporated into the composition prior to irradiation.

The porous coating is preferably in a particulate and/or filamentary form, for example it may be in the form of a mat of filaments or in the form of a mat that contains particulate material dispersed therein. Preferably, however, the porous coating is substantially entirely in particulate form, in which case the particles preferably have a weight average particle size of not more than 100 micrometers, more preferably not more than 50 micrometers and especially not more than 25 micrometers, the preferred coatings having a particle size less than 10 micrometers. It has been found that coatings having particle sizes substantially greater than 100 micrometers may lead to surfaces that have unacceptable roughness. The use of a particulate and/or filamentary coating not only improves the ink receptivity of the coating, but also enables coatings to be formed that are heat-curable but that also have a high degree of latency. That is to say, coatings may be formed that will readily cure within a relatively short length of time when heated, but can be kept for months or even years at ambient temperatures with substantially no premature curing. Such a high degree of latency may be achieved by processing the reactive components of the coating into separate particles and mixing the particles together to form the coating. Thus, the components will exist separately from each other until they are heated, whereupon they will fuse together and react. However, in other cases the reactive components may be melt blended together before comminution.

The porous coating may, if desired, consist solely of the reactive components although it may include one or more inert components. The inert components may be present with the reactive components in the particles, or may be mixed with the particles as a separate phase or both. For example, the coating may comprise a particulate curable resin such as an epoxy resin, preferably one based on bisphenol A or on epoxy novolak resin, as one component and a particulate curing agent having reactive amine groups or a carboxylic acid, phenolic resin isocyanate or polyester curing agent as the other. The curing agent may itself be polymeric for example it may be a polyamide having free amino groups or a carboxylated polymer such as an acid terpolymer, in which case the particles of the curing agent need not contain any inert component. If the curing agent is not polymeric, for example an organic peroxide or other free radical initiator, it may be desirable for it to be blended with a polymeric material, e.g. a polyester or a reactive or unreactive polyamide before comminution. The curable resin, may instead, comprise a polyamide having free amine groups, in which case the curing agent preferably comprises a material having free or blocked isocyanate functional groups, e.g. a cresyl blocked isocyanate. Other curing systems that may be mentioned are unsaturated polyesters or polyurethanes that are cured by a blocked isocyanate curing agent, and polyesters that are cured by a polyepoxide.

Polyamides that may be used for forming one of the components are those that are conventionally used as hot-melt adhesives. These polyamides are characterized by the fact that their amide linkages are separated by an average of at least fifteen carbon atoms and have amorphous structures in contrast with the more highly crystalline, fibre forming polyamides such as nylon 6 or nylon 6.6. The polyamides preferably have an amine number of at least 5, the upper limit for the amine number being determined by the fact that as the amine number increases the polyamides become liquid at lower temperatures. Such polyamides have the advantage that they may also be used to improve the flexibility of the cured coating.

Alternatively or in addition the or at least one material having reactive amine groups is one based on a polymer that is the same as or similar to that on which the epoxy resin is based. For example, and preferably, the or at least one material containing reactive amine groups is an adduct of the epoxy resin that is used with a compound containing reactive amine groups, preferably with an aliphatic diamine or triamine and especially with ethylene diamine or ethylene triamine. The use of an epoxy-amine compound adduct as the other reactive component or one of the other reactive components can significantly improve the cure rate of the adhesive in relation to its storage life, thereby permitting the storage life of the adhesive or the cured properties thereof to be improved.

Chemical curing accelerators may also be present in the coating, either blended with one of the reactive components or as separate particles. Examples of accelerators include dimethylaminopyridine, tris (dimethylaminomethyl) phenol, tin octoate, imidazole or imidazole derivatives such as salts, substituted imidazoles or metal complexes thereof.

Preferred materials for forming the porous coating are described in British Pat. Specification No. 2,104,800A and European Patent Application No. 157,478, the disclosures of which are incorporated herein by reference. The coating may be applied onto the support layer for example as a dispersion in a suitable nonsolvent optionally containing a binder therein, and dried on the support layer. The binder level should be sufficiently great as to form a coatable film and binder levels of up to 15% and preferably from 2 to 15% based on the weight of the other components are found to be appropriate. The material may be applied onto the support layer by any appropriate method, for example by knife coating, screen printing, roll coating or dip coating, or by other methods, but preferably by roll coating or screen printing. The porous coating preferably has a thickness of at least 30 micrometers but preferably not more than 300 and especially not more than 200 micrometers after evaporation of the solvent.

The assembly according to the invention may be used to provide a surface with printed information in a simple manner which may be performed entirely within the customer's plant. The assembly which will usually have a thickness in the range of from 0.1 to 1.5 mm is passed through a printer by means of which appropriate indicia are printed on the side of the assembly that has the porous coating. The printer may be a nonimpact printer e.g. an ink-jet printer, or an impact printer e.g. a thermal printer, dot-matrix printer, daisy wheel printer or golfball printer, and may be attached to any appropriate computer or word-processor. After the indicia have been printed on the assembly the assembly is then heated to initiate curing of the porous layer. This may be achieved by placing a number of printed assemblies in an oven or by passing the assemblies past an infrared radiation source, during which operation the porous layer will preferably be heated to a temperature of about 100° C. to 200° C. preferably from 150° to 170° C. for up to 7 minutes. This heating step causes the particles and/or fibres to melt and coalesce, and allow the components to react. Alternatively the assembly may be heated by driving it between a pair of closely spaced heated blocks. The assembly may then be attached to the surface to be marked by means of any adhesive that is provided on the opposite side of the support layer or by any other means. If the adhesive is a heat activatable adhesive, for example a hot-melt adhesive, it is possible for the uncured assembly to be positioned on the substrate to be marked and heated once only to effect both the curing of the porous layer and bonding of the assembly to the substrate.

According to another preferred embodiment of the marker assembly, the support layer may be in the form of a sleeve, preferably an open-ended sleeve, so that is can be slipped over the end of a wire, cable or other item of electrical equipment. In the case of assemblies having a support layer in the form of a sleeve, it is preferred for the support layer to be dimensionally recoverable and especially for it to be dimensionally heat-recoverable.

Heat-recoverable articles are articles, the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. No. Pat. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline point or, for amorphous materials the softening point, as the case may be, of the polymer, deforming the article and cooling the article whilst in the deformed state so that the deformed state of the article is heat-unstable, application of heat will cause the article to assume its original heat-stable shape.

The sleeves may be positioned on a relatively rigid "comb" like structure which assists in the handling and printing of the sleeves, and removed therefrom once indicia have been formed on the sleeve. Such a structure is described for example in U.S. Pat. No. 3,894,731. Alternatively the support layer may be in the form of a sheet that has been bonded to itself along a series of spaced apart bond lines to define an array of marker sleeves. In yet another form, the support layer may be in the form of a continuous strip which is heat-recoverable and is supported itself on a rigid carrier strip that prevents premature recovery of the support layer when the porous coating is heated. This general type of assembly is described in British Published Specification No. 2,059,913A, the disclosure of which is incorporated herein by reference.

In these embodiments the porous layer is preferably as described above with respect to the first embodiment. In use, the sleeves may simply be separated from one another and placed on the wire or other object to be marked. The sleeve is then heated for example by means of a hot-air gun during which operation the porous coating begins to cure and render the indicia indelible and the sleeve recovers into conformity with the wire or other object.

Several marker assemblies in accordance with the present invention will now be described by way of example with reference to the accompanying drawings in which.

Figure 1:
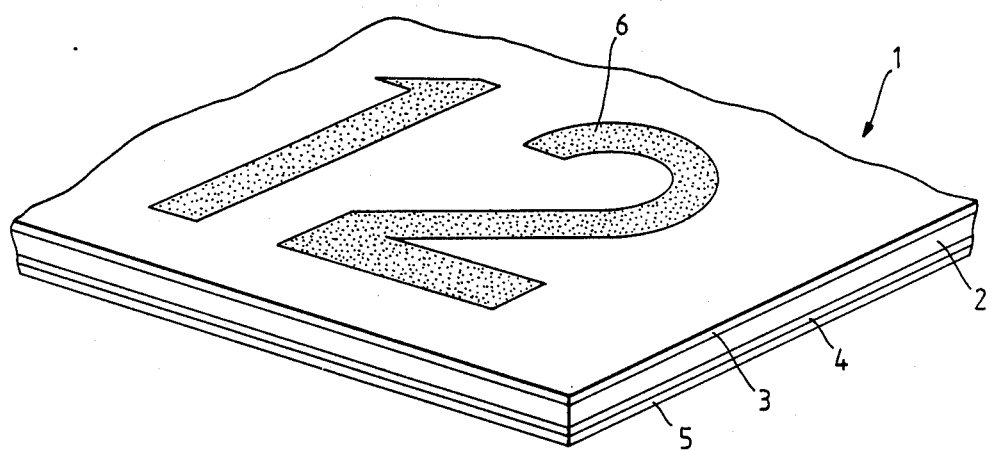
FIG. 1 is a perspective view of a panel marker in accordance with the invention.
Figure 2:
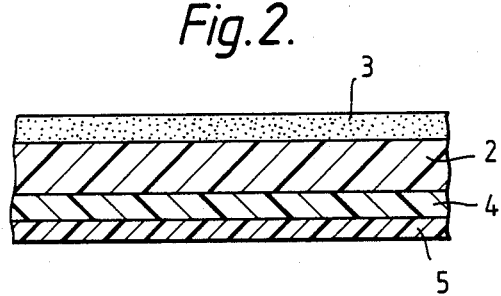
FIG. 2 is a section through part of the marker of FIG. 1 with the thickness of the layers exaggerated for the sake of clarity.

Referring to FIGS. 1 and 2 of the accompanying drawings, a panel marker 1 comprises a flat, flexible support layer 2 formed from a polyester. On one side of the support layer 2 a powdered epoxy/polyamide curable coating 3 has been formed by a knife coating method. The coating 3 has the formulation given in Example 1 below. On the other side of the support layer 2 is a layer of polyamide hot-melt adhesive 4 and a silicone coated release paper 5. The total thickness of the assembly is about 400 micrometers.

The assembly is simply passed through a printer, for example an ink-jet printer, in order to print the indicia 6 on the porous layer and the printed marker is then exposed to an infrared radiation source for a period of about 3 to 5 minutes in order to fuse the epoxy and polyamide particles and initiate curing of the porous layer. The marker is then ready to be adhered to the surface by means of the hot melt adhesive layer 4.

By appropriate choice of the particle size for the porous layer it is possible for a number of surface finishes to be obtained, ranging from very smooth finishes with particles of less than 10 micrometers to coarse finishes with particles larger than 100 micrometers. Where the particles have sizes in the range of from 10 to 100 micrometers, the surface will have a matt finish and so reduce unwanted reflected light.

Figure 3:
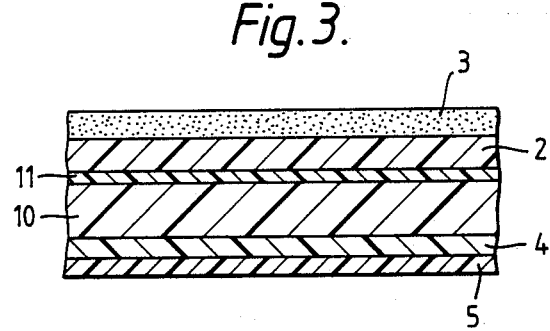
FIG. 3 is a section through part of an alternative form of marker.

FIG. 3 shows an alternative form of marker with the thickness of the layers also exaggerated. In this form of marker the thickness of the support has been considerably increased by means of an additional layer 10 that is bonded to the support layer 2 by means of adhesive layer 11. The additional layer is formed from an aromatic polyester polymer that is highly filled with alumina trihydrate in order to flame retard the layer.

Figure 4:
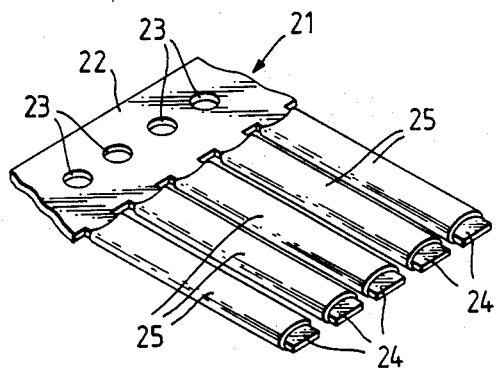
FIG. 4 is a perspective view of another form of assembly in accordance with the invention.

FIG. 4 shows a marker assembly which comprises a "comb" like support structure 21 having a spine 22 that is provided with a number of sprocket holes 23, and an array of bars 24 that extend from one side of the spine 22. Each bar 24 has a heat recoverable sleeve 25 partially recovered thereon, and the outer surface of each sleeve is provided with a curable particulate epoxy/polyamide coating.

The assembly can be fed into a conventional typewriter or printer, with suitable modification to the typewriter on printer platten, and a flat surface of each heat-shrinkable sleeve will be presented to the printer head in correct register for printing indicia on the assembly. After printing the sleeve is slipped onto a wire or other object to be marked and heated to recover the sleeve onto the substrate and to initiate curing of the coating.

Figure 5:
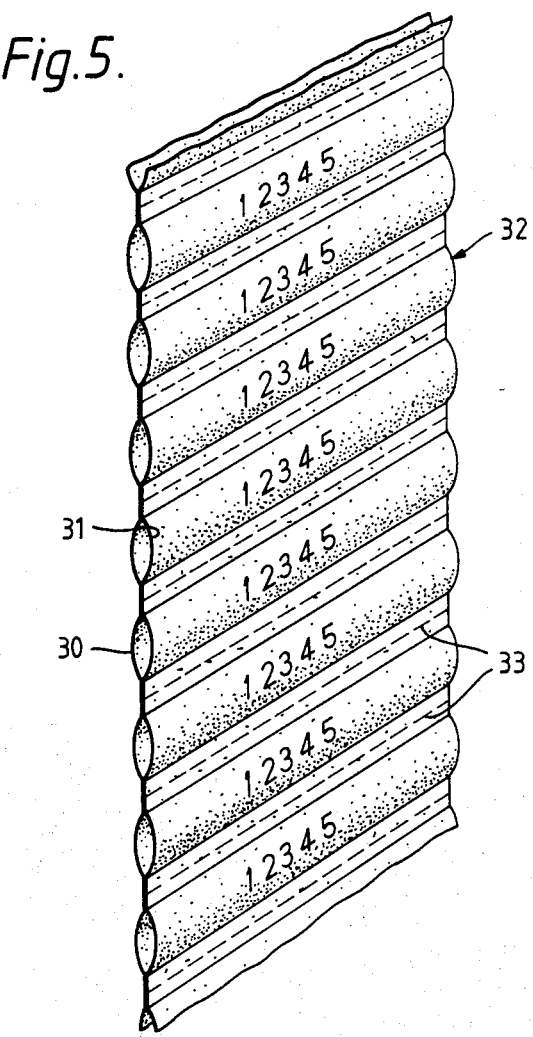
FIG. 5 is a perspective view of yet another form of assembly.

FIG. 5 shows another form of marker assembly that has been formed as described in British Patent Application No. 2,082,110A by stretching a pair of thermoplastic sheets 30 and 31 at a temperature below their melting or softening point, bonding the sheets together to form a plurality of open-ended sleeves 32 separated from one another by bonded portions 33 that contain lines of weakness to allow individual sleeves to be removed. After the sheets have been bonded together, the assembly is irradiated by means of high energy electrons in order to cross-link the polymeric material forming the sheets. The sheets 30 and 31 have been formed from low density polyethylene. After the sheets have been stretched, and bonded together each side of the assembly so formed is solution coated or roll coated with a particulate curable epoxy/polyamide coating as described above.

As with the other arrays, described above, the array may be passed through a conventional printer and, indicia have been formed thereon, individual sleeves may be positioned about a wire and heated to cause it to recover onto the wire and initiate curing of the epoxy/polyamide coating.

The following Examples illustrate the invention:

EXAMPLE 1

A particulate epoxy composition having the composition given in Table I was formed by cryogenically grinding the epoxy resin, the polyamide, the epoxy diamine adduct and the ethylene/vinyl acetate/acrylic acid terpolymer in a Moulinex grinder blender and sieving the particles to a particle size of 53 to 99 micrometers. After grinding, all the components with the exception of the polyethylene oxide were thoroughly mixed together and were added to a 5% aqueous solution of the polyethylene oxide (310 cm$^3$ of water) to form an aqueous dispersion.

TABLE I

| Component | Trade Name | Parts by Weight |
|---|---|---|
| Epoxy Resin | DER 662 | 100 |
| Polyamide (cure agent) | Macromelt 6071 (ex Henkel) | 25 |
| Ethylene diamine - bisphenol A epoxy adduct (cure agent) | | 75 |
| Aluminosilicate filler | | 17 |
| Acid/Ethylene/vinyl acetate terpolymer (flexibilizer) | CXA 2002 (ex Du Pont) | 15.5 |
| Polyethylene oxide (binder) | Polyox (ex Union Carbide) | 15.5 |
| Zinc Oxide Zinc Sulphide or Titanium Dioxide (filler) | | 5 |

The dispersion was then coated onto a 120 micrometer thick polyester sheet using a 4 inch wide doctor blade knife coater to form a 300 to 500 micrometer thick layer. After coating the dispersion was allowed to dry at room temperature for 4 to 12 hours (although drying in air for 4 hours followed by 4 hours under vacuum is preferred).

The assembly so formed was printed with characters in a variety of colours using a Tektronix (trade name) 4695 ink jet printer. The assembly was then heated to about 100° to 200° C. for 3 to 5 minutes using an infrared source in order to cure the coating and render the characters indelible.

The cured assemblies had a matt surface finish and displayed the printed indicia clearly with no loss of definition or colour. The assemblies were tested for solvent resistance by immersing them in the solvents listed in Table II at the temperatures shown for one minute and then hand brushing them with ten strokes, this procedure being repeated a further two times. No deterioration of the assembly was detected in any solvent.

TABLE II

| Solvent | Temperature (°C.) |
|---|---|
| isopropanol (33%) white spirit (67%) | 25 |
| 1,1,1-trichloroethane | 25 |
| trichlorotrifluoroethane (50.5%) dichloromethane (49.5%) | 25 |
| deionized water | 70 |
| methyl ethyl ketone | 25 |
| "Skydrol" aircraft hydraulic fluid | 25 |

EXAMPLE 2

A particulate epoxy composition having the composition given in Table III was formed by cryogenically grinding the epoxy resin and the epoxy diamine adduct separately to a particle size of not more than 100 micrometers and then milling the separate components in a fluid energy mill to form particles of a weight average size of 10 micrometers with substantially no particles greater than 20 micrometers. After milling all the components were thoroughly mixed together and were added to a 3% aqueous solution of polyethylene oxide to form a dispersion that contained 6.5% by weight of polyethylene oxide binder based on the solids content of the dispersion. The dispersion was thoroughly mixed using a planetary mixer followed by ball milling or high shear mixing in order to remove any agglomerates. The emulsion so formed was degassed under vacuum either during or after mixing.

After formation of the emulsion it was coated onto a 23 micrometer thick polyester film having a metallised rear surface and also onto a 50 micrometer thick white polyester film by a three roll reverse coating method conducted at a speed of 1 to 3 meters per minute. The emulsion was applied in each case to a wet thickness of from 150 to 300 micrometers, corresponding to a dry thickness of from 50 to 100 micrometers, and was dried in an oven under forced air at 70° to 80° C. for 1½ to 4 minutes.

The sheet assemblies so formed were then die cut to appropriate label sizes and could then be printed on using a standard single or multiple colour ink-jet or dot matrix printer. After printing, the assemblies could be cured in an oven at 150° to 170° C. for 3 to 5 minutes.

The cured assemblies had a smooth matt surface which displayed the indicia with sufficient definition that individual dots of an ink jet printer could be resolved, and with an accurate reproduction of the original colour. In addition, the assemblies were highly flexible and were resistant to abrasion. The assemblies were tested for solvent resistance as in Example 1 without observing any deterioration of the assemblies in any solvent.

TABLE III

| Component | Parts by Weight |
| --- | --- |
| bisphenol A epoxy resin | 100.0 |
| ethylene diamine-bisphenol A epoxy adduct (cure agent) | 61.5 |
| Aluminosilicate filler | 13.0 |
| polyethylene oxide (binder) | 12.3 |
| Titanium dioxide (pigment) | 3.8 |

Example 3

A marker was formed having a surface coating formed from the composition shown in Table IV.

TABLE IV

| Component | Parts by Weight |
| --- | --- |
| bisphenol A epoxy resin | 100 |
| ethylene diamine-bisphenol A epoxy adduct (cure agent) | 30 |
| Titanium dioxide (pigment) | 54.5 |
| Antioxidant | 1.3 |
| UV stabiliser | 5.2 |
| Polyethylene oxide (binder) | 13.3 |

The epoxy component and the ethylene-diamine adduct were ground to a particle size of less than 100μ. They were then each fluid energy milled to a mean particle size of 20 μ with none greater than 60 μ. All components except the polyethylene oxide were then mixed and blended into a 3% solution of polyethylene oxide to form a dispersion that contained 6.5% by weight of polyethylene oxide binder based on the solids content of the dispersion. The dispersion was then coated onto 120 μ thick polyester sheet using a 4 inch wide doctor blade knife coater to form 300–500 μ thick layer. After coating the dispersion was allowed to dry at room temperature for 4–12 hours.

The assembly so formed was printed with an IBM ink jet printer. The assembly was then heated to 160° C. for 5 minutes using a convection oven in order to cure the coating and render the characters indelible.

The coating finish was matt and was tested for solvent resistance as Example 1. No deterioration was detected in any solvent.

EXAMPLE 4

Example 3 was repeated with the exception that the coating had the composition shown in Table V and that the modified dicyandiamide curing agent was not fluid energy milled.

TABLE V

| Component | Parts by Weight |
| --- | --- |
| bisphenol A epoxy resin | 100 |
| modified dicyandiamide curing agent | 5.3 |
| Titanium dioxide | 12.6 |
| Aluminosilicate filler | 5.3 |
| Polyethylene oxide (binder) | 8.4 |

After curing the marker exhibited a gloss finish. The assembly was tested for solvent resistance as in Example 1 without observing any deterioration of the assemblies in any solvent.

EXAMPLE 5

Example 3 was repeated with the exception that the coating had the composition shown in Table VI and that, after comminution, the epoxy resin, cure agent and titanium dioxide were blended with a 50% solids latex of the ethylene propylene diene monomer (EPDM).

TABLE VI

| Component | Parts by Weight |
| --- | --- |
| bisphenol A epoxy resin | 100 |
| ethylene diamine-bisphenol A epoxy adduct (cure agent) | 61.4 |
| Titanium dioxide | 61.4 |
| ethylene propylene diene monomer latex | 360 |

After curing the marker exhibited a matt finish. The assembly was tested for solvent resistance as in Example 1 without observing any deterioration of the assembly in distilled water, Skydrol or methyl ethyl ketone although some deterioration was observed in other solvents.

EXAMPLE 6

Example 3 was repeated using the composition shown in Table VII and with the exception that the carboxyl terminated polyester and triglycidyl isocyanurate were not fluid energy milled and that the assembly was cured at 180° C. for 5 minutes.

TABLE VII

| Component | Parts by Weight |
| --- | --- |
| carboxyl terminated polyester | 100 |
| triglycidyl isocyanurate | 7.4 |
| Titanium dioxide | 10.5 |
| polyethylene oxide binder | 5.7 |

After curing the marker exhibited a gloss finish. The assembly was tested for solvent resistance as in Example 1 without observing any deterioration of the assemblies in any solvent.

EXAMPLE 7

Example 3 was repeated using the composition shown in Table VIII with the exception that the carboxy terminated polyester was not fluid energy milled and that the assembly was cured at 180° C. for 5 minutes.

TABLE VIII

| Component | Parts by Weight |
|---|---|
| carboxyl terminated polyester | 100 |
| bisphenol A epoxy resin | 100 |
| Titanium dioxide | 20 |
| cure rate accelerator (XB 3146 ex Ciba Geigy) | 4 |
| polyethylene oxide (binder) | 14.4 |

After curing the marker exhibited a gloss finish. The assembly was tested for solvent resistance as in Example 1 without observing any deterioration of the assemblies in any solvent.

EXAMPLE 8

Example 3 was repeated using the components shown in Table IX with the exceptions that the polyester and isophorone di-isocyanate were ground rather than fluid energy milled and that the assembly was cured at 190° C. for 20 minutes.

TABLE IX

| Component | Parts by Weight |
|---|---|
| hydroxyl terminated polyester | 100 |
| isophorone di-isocyanate (IPDI) | 33 |
| Titanium dioxide | 14.5 |
| polyethylene oxide (binder) | 9.4 |

After curing the marker exhibited a gloss finish. The assembly was tested for solvent resistance as in Example 1 without observing any deterioration of the assemblies in any solvent.

When the assembly was solvent tested as described in Example 1 after having been printed on with a dot-matrix printer, no deterioration was observed with isopropanol/white spirit, deionised water and skydrol, although some loss of colour was observed with 1,1,1-trichloroethane, trichlorotrifluoroethane/dichloromethane and methyl ethyl ketone.

We claim:

1. A marker assembly which comprises a support layer having a surface that is provided with a porous coating of a latent curable material that is capable of receiving printed indicia that can subsequently be cured to render the indicia substantially indelible, said porous coating being in particular and/or filamentary form.

2. An assembly as claimed in claim 1, wherein the support layer is in the form of a flat sheet.

3. An assembly as claimed in claim 1, wherein the support layer comprises a polymeric material.

4. An assembly as claimed in claim 1, which is adapted to be secured to an object with the cured coating exposed.

5. An assembly as claimed in claim 4, wherein the assembly includes a layer of adhesive on the surface of the support layer opposite the porous coating.

6. An assembly as claimed in claim 5, wherein the adhesive is a hot-melt, pressure sensitive, or contact adhesive.

7. An assembly as claimed in claim 5, wherein the adhesive is covered by a release layer.

8. An assembly as claimed in claim 1, wherein the support layer is in the form of an open-ended sleeve.

9. An assembly as claimed in claim 1, wherein the support layer is in the form of a sheet that has been bonded to itself or to another sheet along a series of spaced apart bond lines to define an array of marker sleeves.

10. An assembly as claimed in claim 10, wherein the porous coating is in particulate form.

11. An assembly as claimed in claim 1, wherein the porous coating will cure by reaction of plurality of reactive components which exist separately from one another in the form of filaments and/or particles.

12. An assembly as claimed in claim 1, wherein the porous coating comprises an epoxy material.

13. An assembly as claimed in claim 1, wherein the porous coating comprises a polyester.

14. An assembly as claimed in claim 1, wherein the porous coating comprises a material having free amine groups.

15. A method of marking an object which comprises forming indicia on the surface of a support layer, the surface being provided with a porous coating of a curable material, curing the porous coating, and securing the support layer to the object so that the cured coating is exposed; said porous coating being in particulate and/or filamentary form.

16. An method as claimed in claim 15, wherein the coating is heated in order to cure it.

* * * * *